US007146318B2

(12) United States Patent
Laurila et al.

(10) Patent No.: US 7,146,318 B2
(45) Date of Patent: Dec. 5, 2006

(54) SUBBAND METHOD AND APPARATUS FOR DETERMINING SPEECH PAUSES ADAPTING TO BACKGROUND NOISE VARIATION

(75) Inventors: Kari Laurila, Tampere (FI); Juha Häkkinen, Tampere (FI); Ramalingam Hariharan, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/840,003

(22) Filed: May 6, 2004

(65) Prior Publication Data

US 2004/0236571 A1 Nov. 25, 2004

Related U.S. Application Data

(63) Continuation of application No. 09/482,277, filed on Jan. 13, 2000, now abandoned.

(30) Foreign Application Priority Data

Jan. 18, 1999 (FI) ..................................... 990078

(51) Int. Cl.
*G10L 15/04* (2006.01)

(52) U.S. Cl. ...................................................... 704/253

(58) Field of Classification Search ...................... None
See application file for complete search history.

(56) References Cited

U.S. PATENT DOCUMENTS 4,015,088 A * 3/1977 Dubnowski et al. ........ 704/208
4,912,766 A * 3/1990 Forse ......................... 704/225
5,794,199 A 8/1998 Rao et al. ................... 704/258
6,108,610 A * 8/2000 Winn .......................... 702/77

FOREIGN PATENT DOCUMENTS

| | | | |
|---|---|---|---|
| EP | 784 311 A1 | | 7/1997 |
| EP | 0 380 563 B1 | * | 9/1998 |
| WO | WO 00/42600 | * | 7/2000 |

OTHER PUBLICATIONS

J. Iso-Sipilä, K. Laurila, R. Hariharan, and O. Viikki, "Hands-Free Voice Activation in Noisy Car Environment," Proc. Eurospeech 97, Rhodes, Greece, 1997, pp. 2375-2378.*

Olli Viikki, D Bye, and Kari Laurila, "A Recursive Feature Vector Normalization Approach for Robust Speech Recognition in Noise," Proc. 1998 IEEE Int. Conf. Acoust., Speech, Sig. Proc., ICASSP '98, May 12-15, 1998, vol. 2, pp. 733-736.*

Ramalingam Hariharan, Juha Häkkinen, and Kari Laurila, "Robust End-of-Utterance Detection for Real-Time Speech Recognition Applications," Proc. IEEE Int. Conf. Acoust., Speech, Sig. Proc., 2001, May 7-11, 2001, vol. 1, pp. 249-252.*

* cited by examiner

*Primary Examiner*—Donald L. Storm
(74) *Attorney, Agent, or Firm*—Perman & Green, LLP

(57) ABSTRACT

A method for detecting pauses in speech signals is disclosed in which the frequency spectrum is divided into two or more sub-bands. Samples of the signals on the sub-bands are stored at intervals, the energy levels of the sub-bands are determined on the basis of the stored samples, a power threshold value (thr) is determined, and the energy levels of the sub-bands are compared with said power threshold value (thr) . A subband minimum is set and a detection time limit is set so that, in a noise situation, a speech pause can be verified by checking to determine if each pause detected remains for the duration of the detection time limit and if a pause is detected in at least said minimum subbands.

10 Claims, 4 Drawing Sheets

SUBBAND METHOD AND APPARATUS FOR DETERMINING SPEECH PAUSES ADAPTING TO BACKGROUND NOISE VARIATION

CROSS-REFERENCE TO RELATED APPLICATION

This application is a continuation of and claims priority from U.S. patent application Ser. No. 09/482,277, filed on Jan. 13, 2000 now abandoned.

BACKGROUND OF THE INVENTION

The present method relates to a method in speech recognition a speech recognition device and a speech-controlled wireless communication device.

For facilitating the use of wireless communication devices, speech recognition devices have been developed, whereby a user can utter speech commands which the speech recognition device attempts to recognize and convert to a function corresponding to the speech command, e.g. a command to select a telephone number. A problem in the implementation of speech control has been for example the fact that different users say the speech commands in different ways: the speech rate can be different between different users, so does the speech volume, voice tone, etc. Furthermore, speech recognition is disturbed by a possible background noise, whose interference outdoors and in a car can be significant. Background noise makes it difficult to recognize words and to distinguish between different words e.g. upon uttering a telephone number.

Some speech recognition devices apply a recognition method based on a fixed time window. Thus, the user has a predetermined time within which s/he must utter the desired command word. After the expiry of the time window, the speech recognition device attempts to find out which word/command was uttered by the user. However, such a method based on a fixed time window has e.g. the disadvantage that all the words to be uttered are not equally long; for example, in names, the given name is often clearly shorter than the family name. Thus, after a shorter word, more time will be consumed for the recognition than in the recognition of a longer word. This is inconvenient for the user. Furthermore, the time window must be set according to slower speakers so that recognition will not be started until the whole word is uttered. When words are uttered faster, a delay between the uttering and the recognition increases the inconvenient feeling.

Another known speech recognition method is based on patterns formed of speech signals and their comparison. Patterns formed of command words are stored beforehand, or the user may have taught desired words which have been formed into patterns and stored. The speech recognition device compares the stored patterns with feature vectors formed of sounds uttered by the user during the utterance and calculates the probability for the different words (command words) in the vocabulary of the speech recognition device. When the probability for a command word exceeds a predetermined value, the speech recognition device selects this command word as the recognition result. Thus, incorrect recognition results may occur particularly in the case of words in which the beginning resembles phonetically another word in the vocabulary. For example, the user has taught the speech recognition device the words “Mari” and “Marika”. When the user is saying the word “Marika”, the speech recognition device may make “Mari” as the recognition decision, even though the user may not yet have had time to articulate the end of the word. Such speech recognition devices typically use the so-called Hidden Markov Model (HMM) speech recognition method.

U.S. Pat. No. 4,870,686 presents a speech recognition method and a speech recognition device, in which the determination of the end of words by the user is based on silence; in other words, the speech recognition device examines if there is a perceivable audio signal or not. A problem in this solution is the fact that a too loud background noise may prevent the detection of pauses, wherein the speech recognition is not successful.

BRIEF SUMMARY OF THE INVENTION

It is an aim of the present invention to provide an improved method for detecting pauses in speech and a speech recognition device. The invention is based on the idea that a tone band to be examined is divided into sub-bands, and the power of the signal is examined in each sub-band. If the power of the signal is below a certain limit in a sufficient number of sub-bands for a sufficiently long time, it is deduced that there is a pause in the speech.

The present invention gives significant advantages to the solutions of prior art. By the method of the invention, a more reliable detection of a gap between words can be obtained than by methods of prior art. Thus, the reliability of the speech recognition is improved and the number of incorrect and failed recognitions is reduced. Furthermore, the speech recognition device is more flexible with respect to manners of speaking by different users, because the speech commands can be uttered more slowly or faster without an inconvenient delay in the recognition or recognition taking place before an utterance has been completed.

By the division into sub-bands according to the invention, it is possible to reduce the effect of external interference. Spurious signals e.g. in a car have typically a relatively low frequency. In solutions of prior art, the energy contained in the whole frequency range of the signal is utilized in the recognition, wherein signals which are strong but have a narrow band width reduce the signal-to-noise ratio to a significant degree. Instead, if the frequency range to be examined is divided into sub-bands according to the invention, the signal-to-noise ratio can be improved significantly in such sub-bands in which the proportion of spurious signals is relatively small, which improves the reliability of the recognition.

BRIEF DESCRIPTION OF THE DRAWINGS

In the following, the present invention will be described in more detail with reference to the appended drawings, in which.

DETAILED DESCRIPTION OF THE INVENTION

Figure 1:
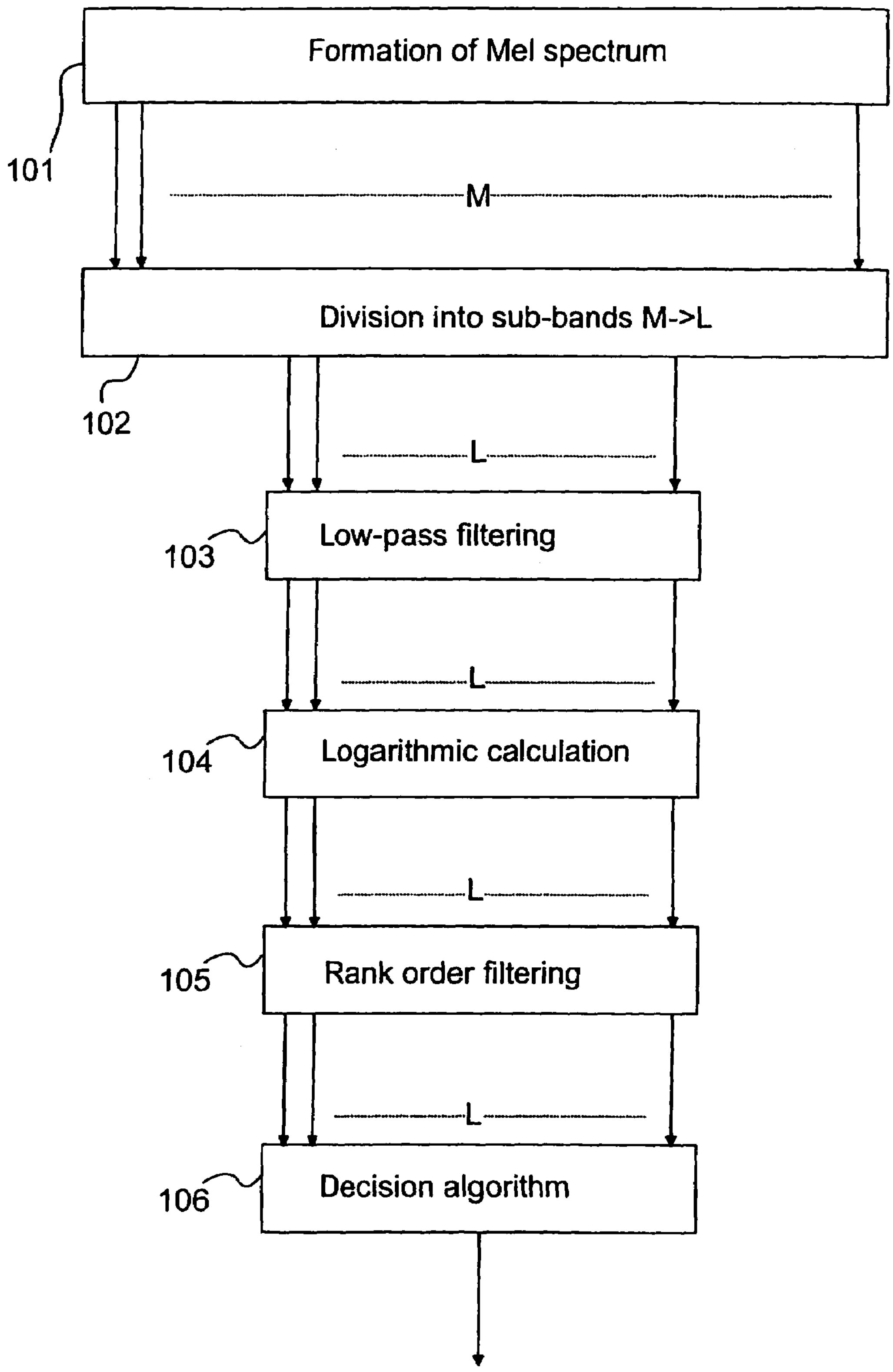
FIG. 1 is a flow chart illustrating the method according to an advantageous embodiment of the invention.
Figure 2:
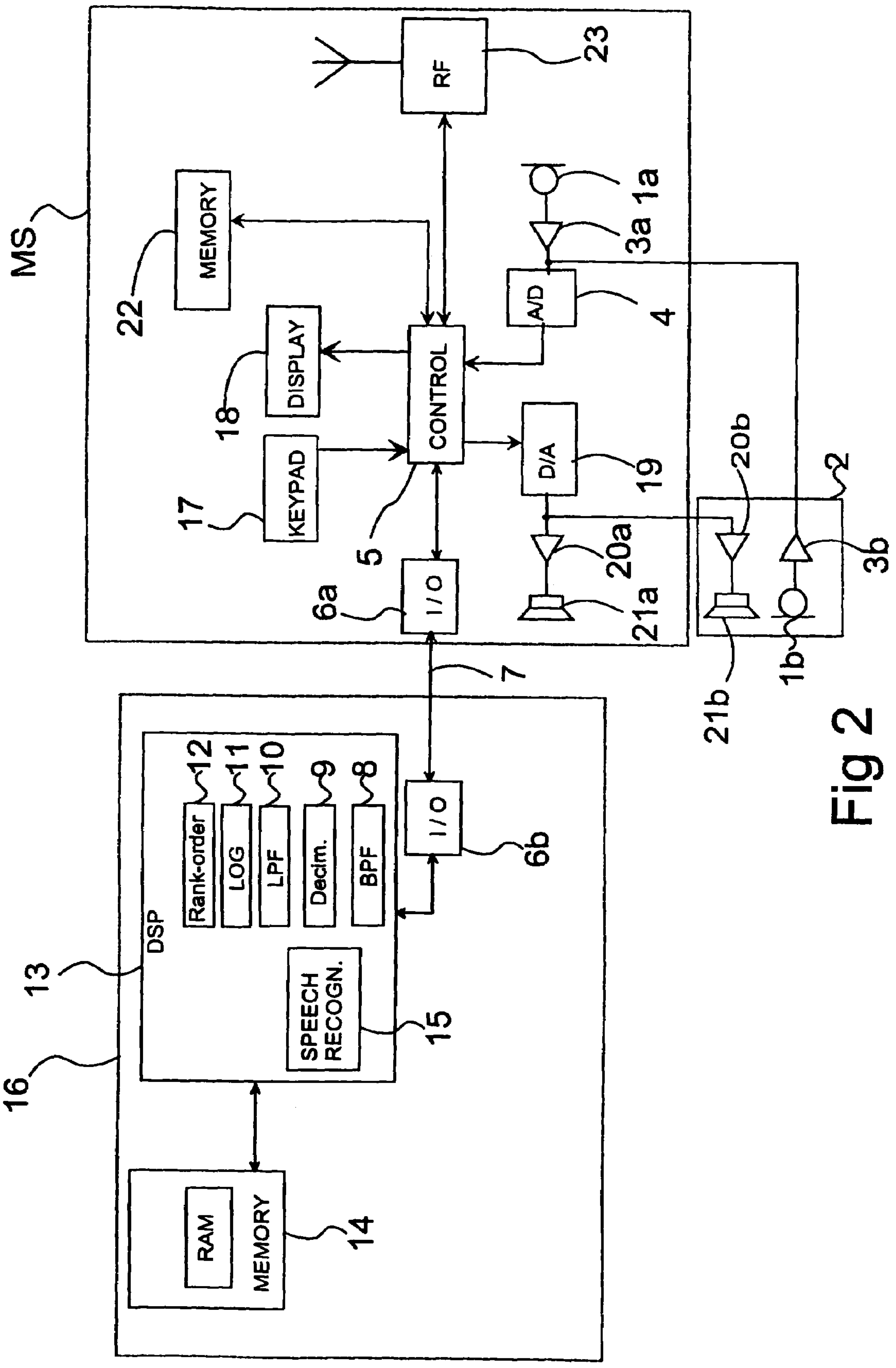
FIG. 2 is a reduced flow chart showing the speech recognition device according to an advantageous embodiment of the invention.

The following is a description on the function of the method according to an advantageous embodiment of the invention, with reference to the flow chart of FIG. 1 and using as an example a speech-controlled wireless communication device MS according to the flow chart of FIG. 2. In the speech recognition, an acoustic signal (speech) is converted, in a way known as such, into an electrical signal by a microphone, such as a microphone 1*a* in the wireless communication device MS or a microphone 1*b* in a hands-free facility 2. The frequency response of the speech signal is typically limited to the frequency range below 10 kHz, e.g. in the frequency range from 100 Hz to 10 kHz. However, the frequency response of speech is not constant in the whole frequency range, but there are more lower frequencies than higher frequencies. Furthermore, the frequency response of speech is different for different persons. In the method of the invention, the frequency range to be examined is divided into narrower sub-frequency ranges (M number of sub-bands). This is represented by block 101 in the appended FIG. 1. These sub-frequency ranges are not made equal in width but taking into account the characteristic features of the speech, wherein some of the sub-frequency ranges are narrower and some are wider. At the low frequencies characteristic of speech, the division is denser, i.e. the sub-frequency ranges are narrower than for the higher frequencies, which frequencies are more rare in speech. This idea is also applied in the Mel frequency scale, known as such, in which the width of frequency bands is based on the logarithmic function of frequency.

In connection with the division into sub-bands, the signals of the sub-bands are converted to a smaller sample frequency, e.g. by under-sampling or by low-pass filtering. Thus, samples are transferred from the block 101 to further processing at this lower sampling frequency. This sampling frequency is advantageously ca. 100 Hz, but it is obvious that also other sampling frequencies can be applied within the scope of the present invention. These samples are converted into said feature vectors.

A signal formed in the microphone 1*a*, 1*b* is amplified in an amplifier 3*a*, 3*b* and converted into digital form in an analog-to-digital converter 4. The precision of the analog-to-digital conversion is typically in the range from 12 to 32 bits, and in the conversion of a speech signal, samples are taken advantageously 8,000 to 14,000 times a second, but the invention can also be applied at other sampling rates. In the wireless communication device MS of FIG. 2, the sampling is arranged to be controlled by a controllers. The audio signal in digital form is transferred to a speech recognition device 16 which is in a functional connection with the wireless communication device 16 and in which different stages of the method according to the invention are processed. The transfer takes place e.g. via interface blocks 6*a*, 6*b* and an interface bus 7. In practical solutions the speech recognition device 16 can as well be arranged in the wireless communication device 16 itself or in another speech-controlled device, or as a separate auxiliary device or the like.

The division into sub-bands is made preferably in a first filter block 8, to which the signal converted into digital form is conveyed. This first filter block 8 consists of several band-pass filters which are in this advantageous embodiment implemented with digital technique and whose frequency ranges and band widths of the pass band differ from each other. Thus each band filtered part of the original signal passes the respective band-pass filter. For clarity, these band-pass filters are not shown separately in FIG. 2. These band-pass filters are implemented advantageously in the application software of a digital signal processor (DSP) 13, which is known as such.

At the next stage 102, the number of sub-bands is reduced preferably by decimating in a decimating block 9, wherein L number of sub-bands are formed (L<M), their energy levels being measurable. On the basis of the signal power levels of these sub-frequency ranges, it is possible to determine the signal energy in each sub-band. Also, the decimating block 9 can be implemented in the application software of the digital signal processor 13.

An advantage obtained by the division into M sub-bands according to the block 1 is that the values of these M different sub-bands can be utilized in the recognition to verify the recognition result particularly in an application using coefficients according to the Mel frequency scale. However, the block 101 can also be implemented by forming directly L sub-bands, wherein the block 102 will not be necessary.

A second filter block 10 is provided for low pass filtering of signals of the sub-bands formed at the decimating stage (stage 103 in FIG. 1), wherein short changes in the signal strength are filtered off and they cannot have a significant effect in the determination of the energy level of the signal in further processing. After the filtration, a logarithmic function of the energy level of each sub-band is calculated in block 11 (stage 104) and the calculation results are stored for further processing in sub-band specific buffers formed in memory means 14 (not shown). These buffers are advantageously of the so-called FIFO type (First In-First Out), in which the calculation results are stored as figures of e.g. 8 or 16 bits. Each buffer accommodates N calculation results. The value N depends on the application in question. Thus, the calculation results p(t) stored in the buffer represent the filtered, logarithmic energy level of the sub-band at different measuring instants.

Figure 3:
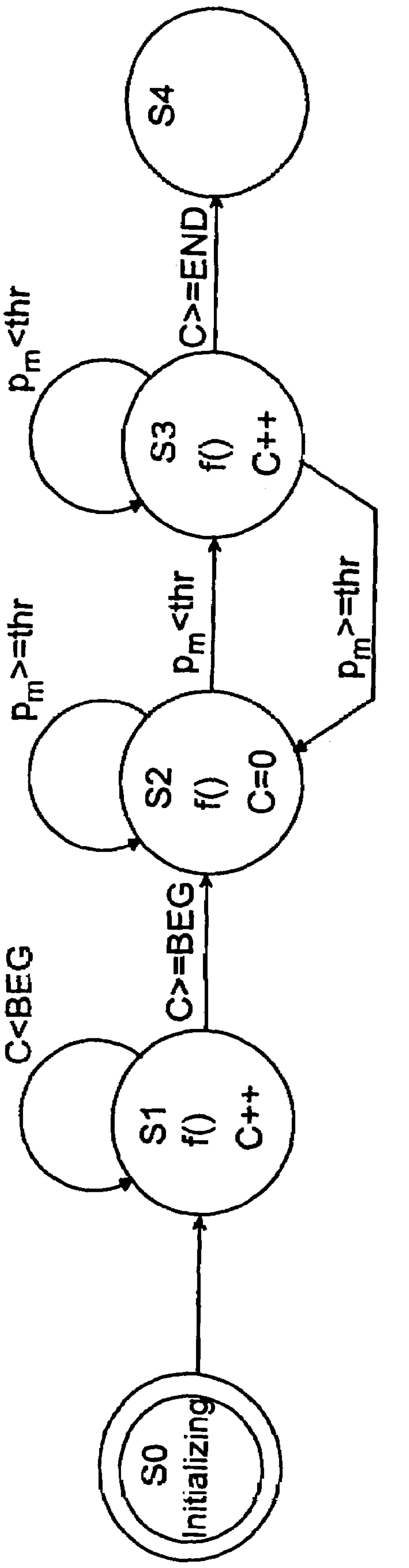
FIG. 3 is a state machine chart illustrating rank-order filtering to be applied in the method according to an advantageous embodiment of the invention.

An arrangement block 12 performs so-called rank order filtering for the calculation results (stage 105), in which the mutual rank of the different calculation results are compared. At this stage 105, it is examined in the sub-bands whether there is possibly a pause in the speech. This examination is shown in a state machine chart in FIG. 3. The operations of this state machine are implemented substantially in the same way for each sub-band. The different functional states S0, S1, S2, S3 and S4 of the state machine are illustrated with circles. Inside these state circles are marked the operations to be performed in each functional state. The arrows 301, 302, 303, 304 and 305 illustrate the transitions from one functional state to another. In connection with these arrows are marked the criteria, whose realization will set off this transition. The curves 306, 307 and 308 illustrate the situation in which the functional state is not changed. Also these curves are provided with the criteria for maintaining the functional state.

In the functional states S1, S2 and S3, a function f( ) is shown, which represents the performing of the following operations in said functional states: preferably N calculation results p(t) are stored in the buffer, and the lowest maximum value p_min(t) and the highest minimum value p_min(t) are determined advantageously by the following formulae:

$$p\_min(t)=\min[\max\langle p(i-N+1),\ p(i-N+2),\ \ldots,\ p(i)\rangle],\ i=N, N+1,\ \ldots,\ t$$

$$p\_max(t)=\max[\min\langle p(i-N+1),\ p(i-N+2),\ \ldots,\ p(i)\rangle],\ i=N,\ N+1,\ \ldots,\ t$$

Consequently, in the function f(t), the maximum value p_max(t) searched is the highest minimum value and the minimum value p_min(t) is the lowest maximum value of the calculation results p(i) stored in the different sub-band buffers. After this, the median power $P(t)_m$ is calculated, which is the median value of the calculation results p(t) stored in the buffer, and a threshold value thr by the formula thr=p_min+k·(p_max−p_min), in which 0<k<1. Next, in the function f( ), a comparison is made between the median power $p(t)_m$ and the threshold value calculated above. The result of the calculation will set off different operations depending on the functional state in which the state machine is at a given time. This will be described in more detail hereinbelow in connection with the description of the different functional states.

After storing a group of sub-band specific calculation results p(t) of the speech (N results per sub-band), the speech recognition device will move on to execute said state machine, which is implemented in the application software of either the digital signal processor 13 or the controller 5. The timing can be made in a way known as such, preferably with an oscillator, such as a crystal oscillator (not shown). The executing is started from the state S0, in which the variables to be used in the state machine are set in their initial values (init( )): a pause counter C is set to zero, the power minimum p_min at the starting moment t=1(p_min (t=1)) is set to the theoretical value of ∞, in practice to the highest possible numerical value available in the speech recognition device.

This maximum value is influenced by the number of bits these power values are calculated with. Correspondingly, the power maximum p_max at the starting moment t=1(p_max (t=1)) is set to the theoretical value of −∞, in practice to the lowest possible numerical value available in the speech recognition device.

After setting of the initial values, the function moves on to the state S1, in which the operations of said function f( ) are performed, wherein e.g. the power minimum p_min and the power maximum p_max as well as the median power $p(t)_m$ are calculated. In the functional state S1, also the pause counter C is increased by one. This functional state prevails until the expiry of a predetermined initial delay. This is determined by comparing the pause counter C with a predetermined beginning value BEG. At the stage when the pause counter C has reached the beginning value BEG, the operation moves on to state S2.

In the functional state S2, the pause counter C is set to zero and the operations of the function f( ) are performed, such as storing of the new calculation result p(t), and calculation of the power minimum p min, the power maximum p_max as well as the median power $p(t)_m$ and the threshold value thr. The calculated threshold value and the median power are compared with each other, and if the median power is smaller than the threshold value, the operation moves on to state S3; in other cases, the functional state is not changed but the above-presented operations of this functional state S2 are performed again.

In the functional state S3, the pause counter C is increased by one and the function f( ) is performed. If the calculation indicates that the median power is still smaller than the threshold value, the value of the pause counter C is examined to find out if the median power has been below the power threshold value for a certain time. Expiry of this time limit can be found out by comparing the value of the pause counter C with an utterance time limit END. If the value of the counter is greater than or equal to said expiry time limit END, this means that no speech can be detected on said sub-band, wherein the state machine is exited.

However, if the comparison of the threshold value and the median power in the functional state S3 showed that the median power exceeded the power threshold value, it can be deduced that speech is detected on this sub-band, and the state machine returns to the functional state S2, in which e.g. the pause counter C is reset and the calculation is started from the beginning.

Consequently, the operation of a state machine to be used in the method according to an advantageous embodiment of the invention was described above in a general manner. In a speech recognition device according to the invention, the above-presented functional stages are performed separately for each sub-band.

Sampling a speech signal is performed advantageously at intervals, wherein the stages 101–104 are performed after the calculation of each feature vector, preferably at intervals of ca. 10 ms. Correspondingly, in the state machine of each sub-band, the operations according to the each active functional state are performed once (one calculation time), e.g. in state S3 the pause counter C(s) of the sub-band in question is increased, the function f(s) is performed, wherein e.g. a comparison is made between the median power and the threshold value, and on the basis of the same, the functional state is either retained or changed.

Figure 4:
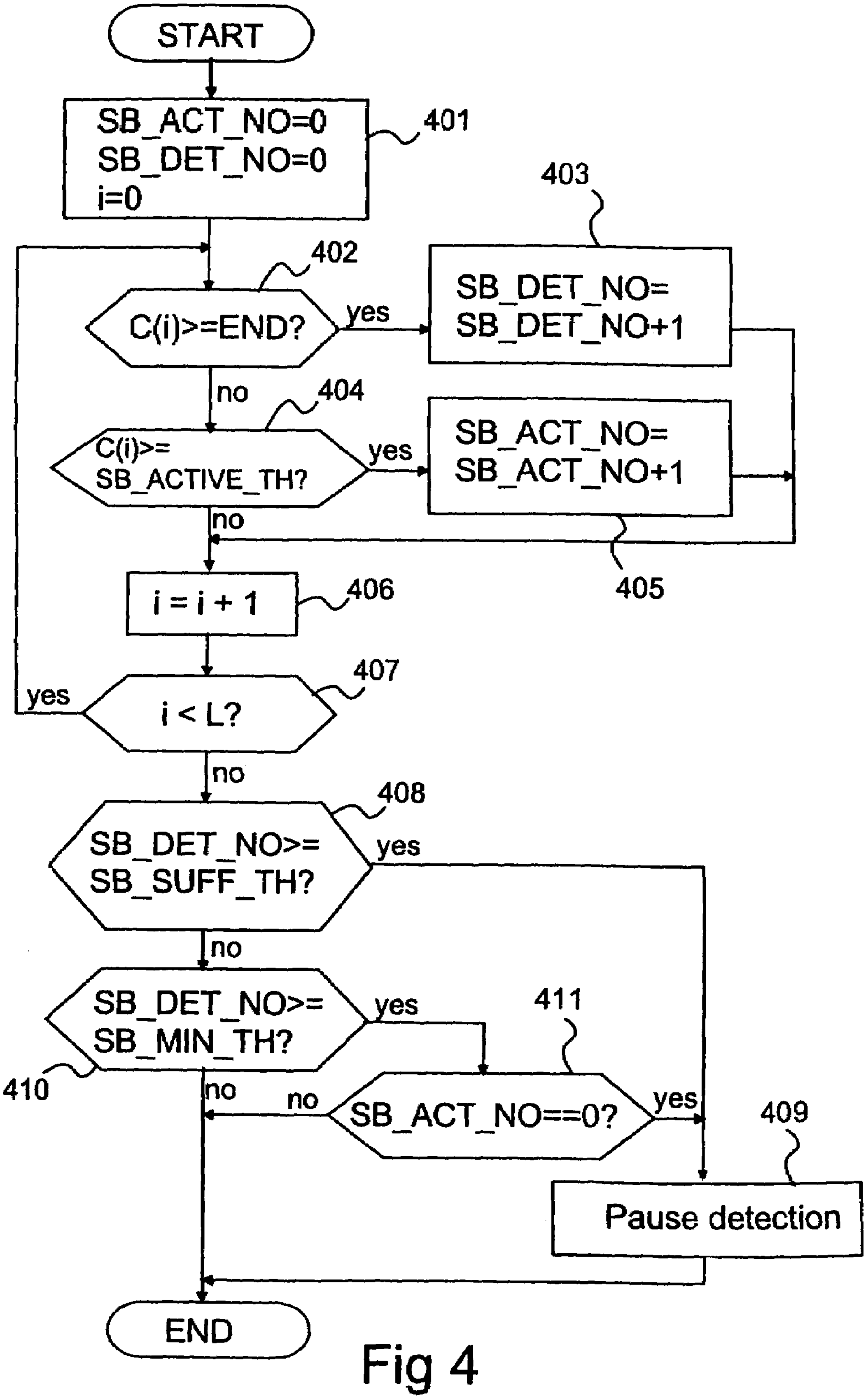
FIG. 4 is a flow chart illustrating the logic for deducing a pause to be applied in the method according to an advantageous embodiment of the invention.

After one calculating round has been performed for the state machines of all the sub-bands, the operation moves on to stage 106 in the speech recognition, wherein it is examined on the basis of the information received from the different sub-bands whether a sufficiently long pause has been detected in the speech. This stage 106 is illustrated as a flow chart in the appended FIG. 4. For clarifying the examination, some comparison values are determined, which are given initial values preferably in connection with the manufacture of the speech recognition device, but if necessary, these initial values can be changed according to the application in question and the usage conditions. The setting of these initial values is illustrated with block 401 in the flow chart of FIG. 4:

- activity threshold SB_ACTIVE_TH whose value is greater than zero but smaller than the detection time limit END,
- detection quantity SB_SUFF_TH whose value is greater than zero but smaller than or equal to the number L of sub-bands,
- minimum number SB_MIN_TH of sub-bands whose value is greater than zero but smaller than the detection quantity SB_SUFF_TH.

In the method according to the invention, to detect a pause in speech it is examined, on how many sub-bands the energy level has possibly remained below said power threshold value and for how long. As disclosed in the functional description of the state machine above, the pause counter C indicates how long the audio energy level has remained below the power threshold value. Thus, the value of the counter is examined for each sub-band. If the value of the counter is greater than or equal to the detection time limit END (block 402), this means that the energy level of the sub-band has remained below the power threshold value so long that a decision on detecting a pause can be made for this sub-band, i.e. a sub-band specific detection is made. Thus, the detection counter SB_DET_NO is preferably increased by one.

If the value of the counter is greater than or equal to the activity threshold SB_ACTIVE_TH (block 404), the energy level on this sub-band has been below the power threshold value thr for a moment but not yet a time corresponding to the detection time limit END. Thus, the activity counter SB_ACT_NO in block 405 is increased preferably by one. In other cases, there is either an audio signal on the sub-band, or the level of the audio signal has been below the power threshold value thr for only a short time.

Next, the operation moves on to block 406, in which the sub-band counter i used as an auxiliary variable is increased by one. On the basis of the value of this sub-band counter i, it can be deduced if all the sub-bands have been examined (block 407).

When the comparisons to the said pause counters have been made, it is examined, on how many sub-bands a pause was detected (the pause counter was greater than or equal to the detection time limit END). If the number of such sub-bands is greater than or equal to the detection quantity SB_SUFF_TH (block 408), it is deduced in the method that there is a pause in the speech (pause detection decision, block 409), and it is possible to move on to the actual speech recognition to find out what the user uttered. However, if the number of sub-bands is smaller than the detection quantity SB_SUFF_TH, it is examined, if the number of sub-bands including a pause is greater than or equal to the minimum number of sub-bands SB_MIN_TH (block 410). Furthermore, it is examined in block 411 if any of the sub-bands is active (the pause counter was greater than or equal to the activity threshold SB_ACTIVE_TH but smaller than the detection time limit END). In the method according to the invention, a decision is made in this situation that there is a pause in the speech if none of the sub-bands is active.

In a noise situation, noise on some sub-bands may effect that a detection decision cannot be made on all sub-bands even though there were a pause in the speech that should be detected. Thus, by means of said sub-band minimum SB_MIN_TH, it is possible to verify the detection of a pause in the speech particularly under noise conditions. Thus, in a noise situation, if a pause is detected on at least said minimum number SB_MIN_TH of sub-bands, a pause is detected in the speech if the pause detection decision on these sub-bands remains in force for the duration of said detection time limit END.

Correspondingly, under good conditions, using said detection time limit END may prevent a too quick decision on detecting a pause. Under good conditions, the said minimum number of sub-bands can quickly cause a pause detection decision, even though there is no such pause in the speech to be detected. By waiting the detection time limit for substantially all of the sub-bands, it is verified that there is actually a pause in the speech.

In another advantageous embodiment of the invention, it is not examined before making the decision of detecting a pause whether any of the sub-bands is active. Thus, the decision on detecting a pause is made on the basis of the results of the comparisons presented above.

The operations presented above can be implemented advantageously e.g. in the application software of the controller or digital signal processor of the speech recognition device.

The above-presented method for detecting a pause in speech according to the advantageous embodiment of the invention can be applied at the stage of teaching a speech recognition device as well as at the stage of speech recognition. At the teaching stage, the disturbance conditions can be usually kept relatively constant. However, when a speech-controlled device is used, the quantity of background noise and other interference can vary to a great extent. For improving the reliability of speech recognition particularly under varying conditions, the method according to another advantageous embodiment of the invention is supplemented with adaptivity to the calculation of the threshold value thr. For achieving this adaptivity, a modification coefficient UPDATE_C is used, whose value is preferably greater than zero and smaller than one. The modification coefficient is first given an initial value within said value range. This modification coefficient is updated during speech recognition preferably in the following way. On the basis of the samples of the sub-bands stored in the buffers, a maximum power level win_max and a minimum power level win_min are calculated. After this, said calculated maximum power level win_max is compared with the power maximum p_max at the time, and said calculated minimum power level win_min is compared with the power minimum p_min. If the absolute value of the difference between the calculated maximum power level win_max and the power maximum p_max, or the absolute value of the difference between the calculated minimum power level win_min and the power minimum p_min has increased from the previous calculation time, the modification coefficient UPDATE_C is increased. On the other hand, if the absolute value of the difference between the calculated maximum power level win_max and the power maximum p_max, or the absolute value of the difference between the calculated minimum power level win_min and the power minimum _min has decreased from the previous calculation time, the modification coefficient UPDATE_C is reduced. After this, a new power maximum and a new power minimum are calculated as follows:

$$p\_\min(t)=(1-\text{UPDATE\_}C)\cdot p\_\min(t-1)+(\text{UPDATE\_}C\cdot \text{win\_min})$$

$$p\_\max(t)=(1-\text{UPDATE\_}C)\cdot p\_\max(t-1)+(\text{UPDATE\_}C\cdot \text{win\_max})$$

The calculated new power maximum and minimum values are used at the next sampling round e.g. in connection with the performing of the function f(). The determination of this adaptive coefficient has e.g. the advantage that changes in the environmental conditions can be better taken into account in the speech recognition and the detection of a pause becomes more reliable.

The above-presented different operations for detecting a pause in the speech can be largely implemented in the application software of the controller and/or the digital signal processor of the speech recognition device. In the speech recognition device according to the invention, some of the functions, such as the division into sub-bands, can also be implemented with analog technique, which is known as such. In connection with the execution of the method, in the storing of the calculation results to be made at different stages, the variables, etc., it is possible to use the memory means 14 of the speech recognition device, preferably a random access memory (RAM), a non-volatile random access memory (NVRAM), a FLASH memory, etc. The memory means 22 of the wireless communication device can as well be used for storing information.

FIG. 2, showing a the wireless communication device MS according to an advantageous embodiment of the invention, additionally shows a keypad 17, a display 18, a digital-to-analog converter 19, a headphone amplifier 20*a*, a headphone 21, a headphone amplifier 20*b* for a hands-free function 2, a headphone 21*b*, and a high-frequency block 23, all known per se.

The present invention can be applied in connection with several speech recognition systems functioning by different principles. The invention improves the reliability of detection of pauses in speech, which ensures the recognition reliability of the actual speech recognition. Using the method according to the invention, it is not necessary to perform the speech recognition in connection with a fixed time window, wherein the recognition delay is substantially not dependent on the rate at which the user utters speech commands. Also, the effect of background noise on speech recognition can be made smaller upon applying the method of the invention than is possible in speech recognition devices of prior art.

It is obvious that the invention is not limited solely to the embodiments presented above, but it can be modified within the scope of the appended claims.

The invention claimed is:

1. A method for detecting pauses in speech recognition, in which method, for recognizing speech commands uttered by a user, the speech is converted into an electrical signal, the frequency spectrum of the electrical signal is divided into two or more sub-bands, samples of the signals in the sub-bands are stored at intervals, the energy levels of the sub-bands are determined on the basis of the stored samples, a power threshold value (thr) is determined, and the energy levels of the sub-bands are compared with said power threshold value (thr), wherein the comparison results are used for producing a pause detecting result, and further wherein a detection time limit (END) and a detection quantity (SB_SUFF_TH) are determined, wherein in the method, the calculation of the length of a pause in a sub-band is started when the energy level of the sub-band falls below said power threshold value (thr), wherein in the method, a sub-band specific detection is performed when the calculation reaches the detection time limit (END), it is examined on how many sub-bands the energy level was below the power threshold value (thr) longer than the detection time limit (END), wherein a pause detection decision is made if the number of sub-band specific detections is greater than or equal to the detection quantity (SB_SUFF_TH) and further wherein an activity time limit (SB_ACTIVE_TH) and an activity quantity (SB_MIN_TH) are determined, wherein a pause detection decision is made if the quantity of sub-band specific detections is greater than or equal to the activity quantity (SB_MIN_TH) and the activity time limit (SB_ACTIVE_TH) has not been reached on the other sub-bands in the calculation of the length of the pause in the sub-band.

2. The method according to claim 1, characterized in that said power threshold value (thr) is calculated adaptively by taking into account the environmental noise level at each instant.

3. A method for detecting pauses in speech recognition, in which method, for recognizing speech commands uttered by a user, the speech is converted into an electrical signal, the frequency spectrum of the electrical signal is divided into two or more sub-bands, samples of the signals in the sub-bands are stored at intervals, the energy levels of the sub-bands are determined on the basis of the stored samples, a power threshold value (thr) is determined, and the energy levels of the sub-bands are compared with said power threshold value (thr), wherein the comparison results are used for producing a pause detecting result, wherein a pause detection is performed on each sub-band on the basis of the comparison results, the number of sub-bands on which a pause is detected are compared with an activity threshold, wherein if the number of sub-bands on which a pause is detected is greater than said activity threshold, it is deduced that there is a pause in the speech, and further wherein the power threshold value (thr) is calculated by the formula:

$$thr=p\_min+k\cdot(p\_max-p\_min),$$

in which p_min=the smallest power maximum determined of the stored samples of the sub-bands, and p_max=the greatest power minimum determined of the stored samples of the sub-bands k=a factor that is greater than zero and less than one.

4. A method for detecting pauses in speech recognition, in which method, for recognizing speech commands uttered by a user, the speech is converted into an electrical signal, the frequency spectrum of the electrical signal is divided into two or more sub-bands, samples of the signals in the sub-bands are stored at intervals, the energy levels of the sub-bands are determined on the basis of the stored samples, a power threshold value (thr) is determined, and the energy levels of the sub-bands are compared with said power threshold value (thr), wherein the comparison results are used for producing a pause detecting result, wherein a pause detection is performed on each sub-band on the basis of the comparison results, the number of sub-bands on which a pause is detected are compared with an activity threshold, wherein if the number of sub-bands on which a pause is detected is greater than said activity threshold, it is deduced that there is a pause in the speech, wherein said power threshold value (thr) is calculated adaptively by taking into account the environmental noise level at each instant and further wherein, for calculating said power threshold value (thr), a modification coefficient (UPDATE_C) is determined, and on the basis of the stored samples, the greatest power level (win_max) and the smallest power level (win_min) of the sub-bands are calculated, wherein the power maximum (p_max) and power minimum (p_min) are determined by the formulae:

$$p\_max(i,t)=(1-UPDATE\_C)\cdot p\_max(i,t-1)+(UPDATE\_C\cdot win\_max)$$

$$p\_min(i,t)=(1-UPDATE\_C)\cdot p\_min(i,t-1)+(UPDATE\_C\cdot win\_min)$$

in which 0<UPDATE_C<1,

0<i<L, and

L is the number of sub-bands t is an integer number having a value greater than or equal to 1 representing different moments in time, wherein t−1 is the moment in time preceding t.

5. The method according to claim 4, characterized in that further in the method, the modification coefficient (UPDATE_C) is increased, if the absolute value of the difference between said calculated greatest power level (win_max) and the power maximum (p_max), or the absolute value of the difference between said calculated smallest power level (win_min) and the power minimum (p_min) has increased, the modification coefficient (UPDATE_C) is reduced, if the absolute value of the difference between said calculated greatest power level (win_max) and the power maximum (p_max), or the absolute value of the difference between said calculated smallest power level (win_min) and the power minimum (p_min) has decreased.

6. A speech recognition device (16) comprising: means (1*a*, 1*b*) for converting speech commands uttered by a user into an electrical signal, means (8) for dividing the frequency spectrum of the electrical signal into two or more sub-bands, means (14) for storing samples of the signals of the sub-bands at intervals, means (5, 13) for determining energy levels of the sub-bands on the basis of the stored samples, means (5, 13) for determining a power threshold value (thr), means (5, 13) for comparing the energy levels of the sub-bands with said power threshold value (thr), and means (5, 13) for detecting a pause in the speech on the basis of said comparison results, wherein the power threshold value is calculated by the formula:

$$thr = p\_min + k \cdot (p\_max - p\_min),$$

in which p_min=the smallest determined power maximum of the stored samples of the sub-bands, and p_max=the greatest determined power minimum of the stored samples of the sub-bands k=a factor that is greater than zero and less than one.

7. The speech recognition device (16) according to claim 6, characterized in that it comprises also means (10, 11) for filtering the signals of the sub-bands before storage.

8. A method for detecting pauses in speech during speech recognition comprising:

recognizing speech uttered by a user;

converting said speech into an electrical signal;

dividing the frequency spectrum of the electrical signal into two or more sub-bands;

storing samples of the signals in the sub-bands at intervals;

calculating the energy levels of each of the sub-bands on the basis of the stored samples;

setting a power threshold value;

comparing the calculated energy levels of each of the sub-bands with said power threshold value;

counting the number of sub-bands in which said calculated energy levels are below said power threshold value;

setting an activity threshold for determining a pause in said speech at a predetermined number of sub-bands;

comparing said counted number of sub-bands with said activity threshold, wherein, if said counted number of sub-bands is greater than said activity threshold, a pause in speech is indicated;

determining an activity time limit (SB_ACTIVE_TH) and an activity quantity (SB_MIN_TH), wherein a pause detection decision is made if said counted number is greater than or equal to the activity quantity (SB_MIN_TH) and the activity time limit (SB_ACTIVE_TH) has not been reached on a sub-band in a calculation of a length of the pause in the sub-band.

9. A method according to claim 8, further comprising:

setting a predetermined time threshold; and counting the number of sub-bands in which said calculated energy levels are below an energy level threshold value for at least said predetermined time threshold.

10. A speech recognition device comprising:

a converter for converting speech commands uttered by a user into an electrical signal; a divider for dividing the frequency spectrum of the electrical signal into two or more sub-bands;

a memory for storing samples of the signals of the sub-bands at intervals;

a processor configured to determine energy levels of the sub-bands on the basis of the stored samples; determine a power threshold value (thr); compare the energy levels of the sub-bands with said power threshold value (thr); and detect a pause in the speech on the basis of said comparison results;

wherein said processor is configured to calculate the power threshold value by the formula:

$$thr = p\_min + k \cdot (p\_max - p\_min),$$

in which p_min=the smallest determined power maximum of the stored samples of the sub-bands, and p_max=the greatest determined power minimum of the stored samples of the sub-bands k=a factor that is greater than zero and less than one.

* * * * *